July 18, 1950     E. J. FITZGERALD     2,515,866
ELECTRIC TOASTER

Filed Sept. 19, 1947     3 Sheets-Sheet 1

INVENTOR.
Edward J. Fitzgerald
BY George E. Cook

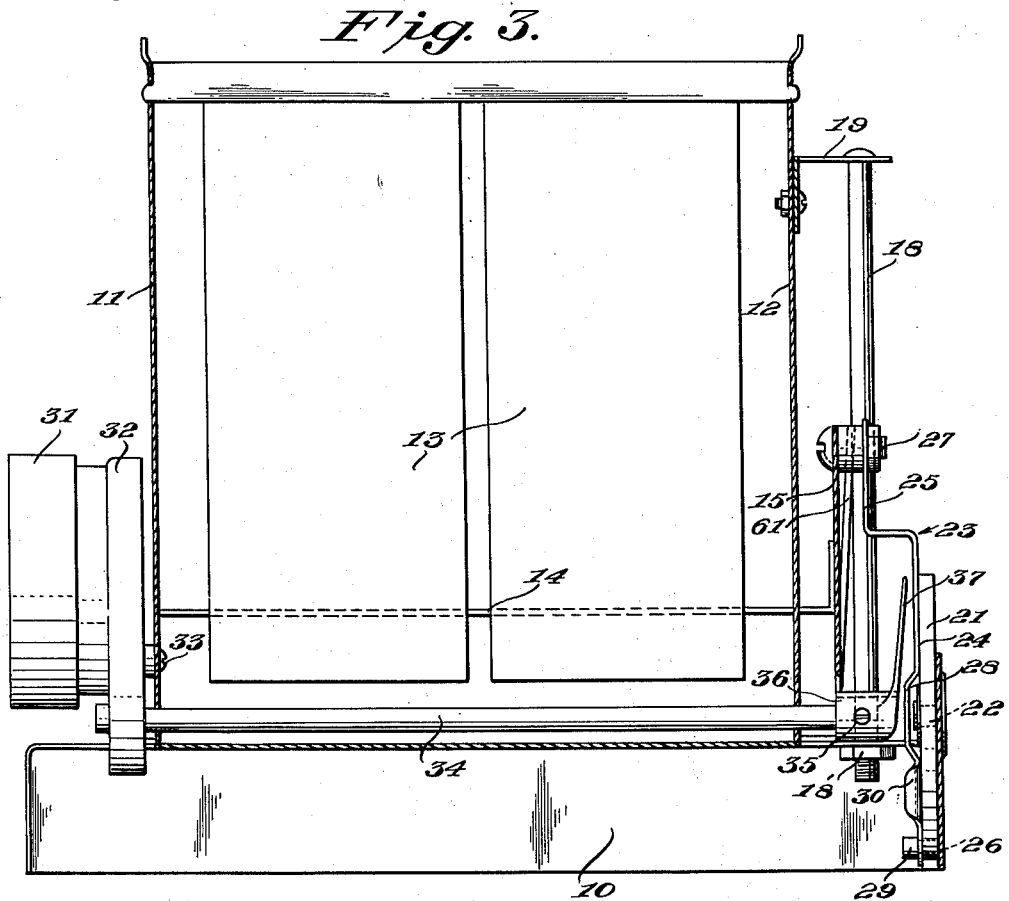

July 18, 1950     E. J. FITZGERALD     2,515,866
ELECTRIC TOASTER
Filed Sept. 19, 1947     3 Sheets-Sheet 3
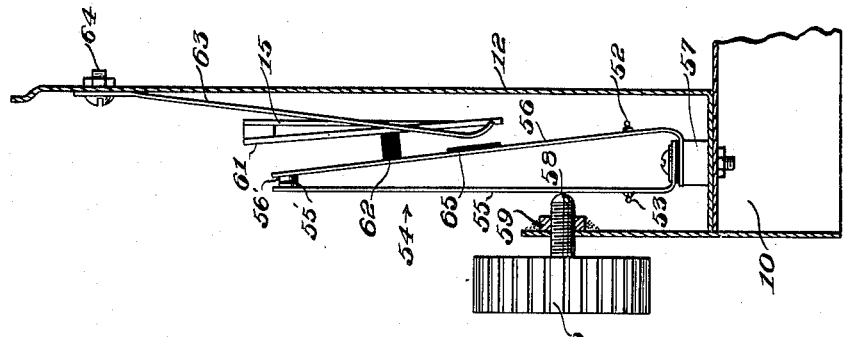
Fig. 5-B.
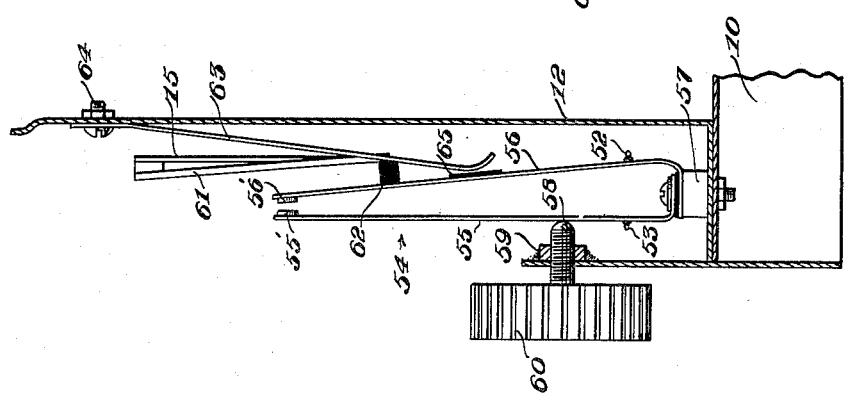
Fig. 5-A.
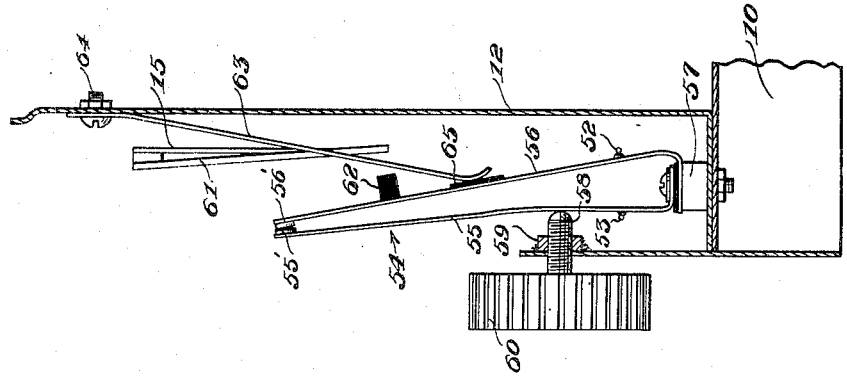
Fig. 5.
INVENTOR.
Edward J. Fitzgerald
BY
George E. Cook Patented July 18, 1950

2,515,866

UNITED STATES PATENT OFFICE 2,515,866

ELECTRIC TOASTER

Edward J. Fitzgerald, Winsted, Conn., assignor to Son-Chief Electrics, Incorporated, Winsted, Conn., a corporation of Connecticut Application September 19, 1947, Serial No. 775,075

13 Claims. (Cl. 99—327)

This invention relates to a toaster.

A primary object of the invention is the provision of a toaster which is relatively simple in construction and which is capable of expeditiously toasting bread to any desired degree through manipulation of a single control member.

A further object of the invention is the provision of a toaster wherein slices of bread are lowered into position between heating elements by gravity and wherein the slices remain quiescent in their lowered position for a predetermined and uniform interval of time, and wherein the slices of bread are finally slowly raised by motor power to a removing position.

A still further object of the invention is the provision of a toaster embodying heating elements, bread supporting bars vertically movable between the heating elements, and adjustable control means for the circuit through the heating elements operable at a pre-determined interval in a toasting cycle by movement of the bars to break the circuit through the heating elements whereby to judiciously control the toasting action on the bread.

Other objects and advantages of the invention will become apparent in the course of the following detailed description, taken in connection with the accompanying drawings, wherein—

Fig. 3 is a substantially central longitudinal vertical sectional view with the circuit control contacts omitted for greater clarity in illustration.

Fig. 4 is a top plan view of one end of the toaster.

Figs. 5, 5A and 5B are fragmental views showing in particular the heating element circuit control means, the bread supporting slide being shown without the supporting means therefor for clearer understanding of the operation of this particular part of the structure.

Figure 1:
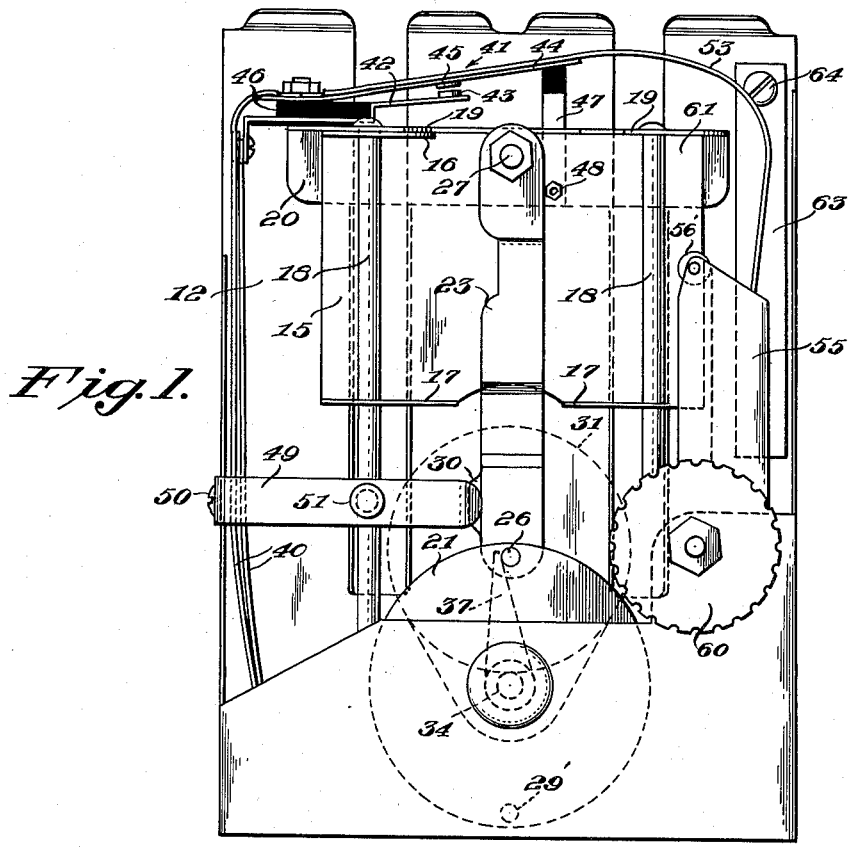
Fig. 1 is an end elevational view of the improved toaster with the outer casing thereof removed for greater clarity of the structure thereof.

Referring now in detail to the drawings, the supporting frame includes a base 10 and opposed vertically disposed end members 11 and 12. Disposed above the base 10 and supported by the end members 11 and 12 are a plurality of vertically disposed and laterally spaced heating elements 13 which are of well known construction and between which slices of bread are movably disposed for the toasting thereof.

The device includes a pair of horizontally disposed bars 14 for supporting the lower edges of slices of bread and corresponding ends of such bars are rigidly connected with a vertically disposed slide 15.

The slide is provided with an apertured ear 16 at its upper end and a pair of apertured ears 17 at its lower end and the slide is guided in its vertical movements by means of a pair of rods 18 passing freely through said apertured ears. The upper ends of the rods are headed and extend through lugs 19 projecting from a plate 20 suitably secured to the end member 12 and the lower ends of the rods extend through the base and are provided with nuts 18'.

A disc 21 is rotatably supported by the base 10 in spaced relation to and parallel with the end member 12, the disc being rotatably supported as at 22.

A link 23 including a substantially long lower portion 24 and an offset relatively short upper portion 25, is pivotally connected at its lower end to the disc near its periphery as at 26 and is pivotally connected at its upper end to the slide as at 27.

With this construction, the disc and slide are simultaneously rotatable and vertically slidable respectively with the link partaking of a combined vertical and oscillating movement. As is more particularly shown in Fig. 3, the link portion 24 is offset at 28 to clear the pivotal connection 22 of the disc 21 and the pivot 26 is extended in the provision of a pin 29. The link 23 is further provided with an inwardly inclined lip 30 for a purpose later to appear.

A motor 31 operatively associated with a reduction gearing assembly 32 is rigidly supported by the end member 11 through the instrumentality of screws 33. A shaft 34 is suitably journalled adjacent its opposite ends in end members 11 and 12 and is operatively connected at one end thereof with the reduction gear assembly for relative slow rotation thereof as compared to that of the motor shaft. The opposite end of the shaft has secured thereto as by means of a screw 35 the hub 36 of a drive arm 32. Current is supplied to the motor through use of an electric cord C whose wires 39 and 40 are connected to the motor, thereby providing the circuit indicated in Fig. 2.

A switch 41 is included in such circuit for controlling the operation of the motor 31. This switch is preferably constructed as shown in Figs. 1 and 4 and includes a lower relatively rigid contact member 42 having a contact 43 and an upper yieldable contact member 44 having a contact 45, the two contact members being insulated from each other as at 46. The yieldable contact member 44 normally urges its contact into engagement with contact 43 for closing the circuit through the motor.

In insulated switch opening finger 47 is suitably connected to the slide 15 as at 48 and such finger is so disposed as to open the switch 41 when the slide 15 is in fully vertically raised position as in Fig. 1.

In this position, the link 23 is in dead position, that is, pivots 22, 26 and 27 are vertically alined and the slide 15 will remain in this position in the absence of any forces applied thereto. This is the rest or toast removing and bread inserting position wherein the bars 14 are well up between the heating elements, and the motor is at rest with the circuit therefor broken due to the opening of switch 41 by the finger 47.

With the apparatus in this position, slices of bread are introduced through the usual slots in the outer casing (not shown) and rested on the bars 14. The apparatus is then set into operation and to effect such a yieldable member 49 has one end thereof secured to end member 12 as at 50 and the other end is normally spaced from but is engageable with the lip 30 whereby the link 23 is urged to the right (Fig. 1) with the result that the slide 15, together with bars 14 and the bread supported thereby, drops by gravity, the slide being then in its lower position as indicated in Fig. 3.

The yieldable member is operable by means of a plunger 51 adapted to project through a suitable opening in the toaster casing. Upon this initiating downward movement of the slide 15, the switch 41 is closed whereby the motor 31 is set into operation and the arm 37 will start to rotate slowly. Upon this downward movement of slide 15 by gravity however, the pin 29 will move away from the driving arm 37 and such pin will be in the position of the dotted circle 29' in Fig. 1 when the arm 37 is still substantially at its position in Fig. 1 and therefore the slide, together with bars 14 and the bread supported thereby will remain quiescent until the arm 37 reaches the position of pin 29'.

When the arm then contacts the pin the slide together with the bread will be slowly elevated until the position in Fig. 1 is again reached wherein the switch 41 will be opened with the arm at rest adjacent the pin and the slide operating link 23 in dead center position.

From the above it will be seen that the toasting cycles are of uniform duration and that the bread remains quiescent in the well of the toaster for substantially one-half of such duration and is slowly elevated to releasing position during the other half of said duration or toasting cycle.

The improved toaster in accordance with this invention further includes means for varying the degree of toasting action on the bread, that is, to provide light to dark toast or any intermediate stage.

Since the intervals of disposition of the bread between the heating elements is constant, the varying of the toasting action is effected by controlling the circuit to the heating elements.

Figure 2:
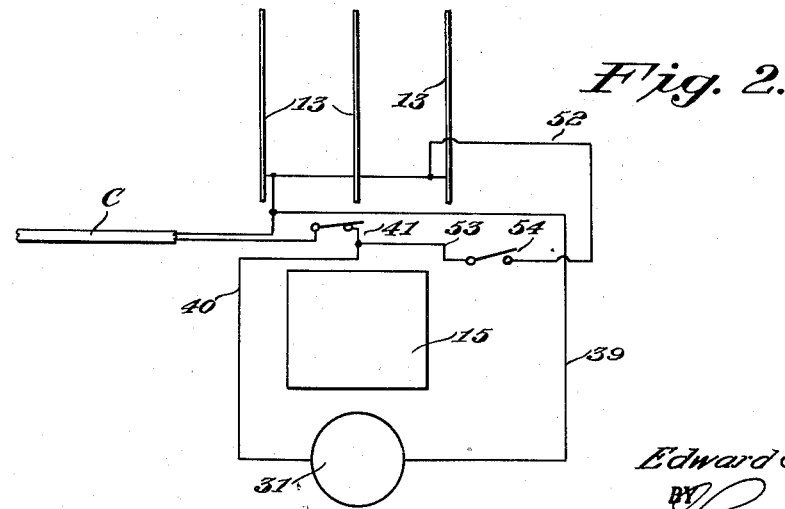
Fig. 2 is a wiring diagram.

As is indicated in Fig. 2, the heating elements 13 are in a shunt circuit including wires 52 and 53, respectively connected to the motor circuit wires 39 and 40 and which are connected by a switch 54.

The switch 54 comprises a pair of yieldable contact members 55 and 56 whose lower ends are insulated from each other and suitably connected to the base 10 as indicated at 57, the wires 52 and 53 being suitably connected, as by soldering to the contact members.

The contact member 55 is engageable by a screw 58 threadedly engaged with a nut 59 suitably connected, as by soldering, to the frame, and such screw is provided with an operating knob 60. The slide 15 is provided with a cam track 61 engageable by a follower 62 of insulating material carried by the contact member 56.

When first starting a toasting operation with the entire apparatus cold, it is preferable to heat the elements 13 throughout the first toasting cycle and with the contacts 55' and 56' in engagement, or the switch 54 closed.

In order to provide for this action, a strip of thermostatic metal 63 has one end thereof secured to end member 12 as at 64, the other end thereof being curved and which when the strip is cold engages an insulated projection 65 on the contact member 56 and thereby holds the contacts 55' and 56' in engagement and in this position the follower 62 is entirely out of range of the cam track 61.

The contacts 55', 56' will remain closed during the first toasting cycle when the strip 63 will, due to the heat developed, retract to the position of Figs. 5—A and 5—B wherein the follower 62 is within range of action of the cam track 61.

After the first toasting cycle the follower 62 will always engage the cam track 61. With the position of the screw 58 shown in Figs. 5—A and 5—B the contacts 55', 56' will open when the slide 15 is about half way up whereby the switch 54 will be opened and no further toasting action on the bread will take place.

Upon clockwise rotation of the knob 60, the contacts 55', 56' may be retained in engagement for more than one-half of the upward movement of the slide or for the entire movement thereof, and upon anti-clockwise rotation of the knob the toasting action may be interrupted earlier in the upward travel of the slide.

Thus, it will be seen that this improved control provides for easily and quickly varying the toast from light to dark and a suitable marked dial may be provided on the casing and the knob 60 provided with a suitable pointer whereby any desired grade of toast may be readily selected.

While I have disclosed the invention in accordance with a single specific embodiment thereof, such is to be considered as illustrative only, and not restrictive, the scope of the invention being defined in the sub-joined claims.

What I claim and desire to secure by U. S. Letters Patent is:

1. A toaster comprising a frame, laterally spaced and vertically disposed heating elements supported by the frame, a slide supported by the frame for vertical movement and having bread slice supporting bars projecting therefrom and extending between the heating elements, a disk rotatably supported by the frame, a vertically disposed link having the upper end thereof pivotally connected to the slide and the lower end thereof pivotally connected to the disk adjacent the periphery thereof, an electric motor supported by the casing, drive means operable by the motor and including a member freely engageable with said lower link pivotal connection to raise the slide to its uppermost bread loading position and with the center of the disk and link pivotal connections vertically alined for retaining the slide in said position, a switch in the motor circuit operable by the slide when reaching said position to break the circuit through the motor, and manually operable means for displacing the alinement of said pivotal connections and the center of said disk for downward movement of the slide and bread supporting bars by gravity.

2. A toaster comprising a frame, laterally spaced and vertically disposed heating elements supported by the frame, a slide supported by one end of the frame for vertical movement, bread slide supporting bars projecting from the slide and extending between the heating elements, a disk rotatably supported by the frame, a vertically disposed link having the upper end thereof pivotally connected to the slide and the lower end thereof pivotally connected to the disk adjacent the periphery thereof, the said link pivotal connections and the center of said disk being vertically alined when the slide is at its uppermost position whereby to retain the slide in such position and with the bars in raised bread loading position, an electric motor supported by the frame, a self-closing switch in the circuit to said motor operable by the slide in said position to break the current and stop the motor, manually operable means engageable with the link to displace said alinement of the pivotal connections and the center of said disk for downward movement of the slide and bars by gravity, and a rotatable arm driven by said motor and engageable with a projection on the disk to rotate same through 180° to raise the slide from its lowermost position to its uppermost position, the said arm following said projection in arrears thereof during downward movement of the slide, the said switch automatically closing upon the beginning of the downward movement of the slide.

3. A toaster according to claim 2 together with reduction gearing connected with said motor whereby said arm is driven at a substantially slow speed such that the slide remains quiescent in its lowermost position for a period substantially equal to the period of slide raising movement.

4. A toaster according to claim 2 wherein said arm is driven by a shaft rotatably supported in the frame in co-axial relation to said disk, and a connection between said shaft and said motor including reduction gearing.

5. A toaster according to claim 2 wherein said switch includes a pair of spring arms provided with cooperating contacts normally engaged, one of said arms being longer than the other, and a finger carried by the slide and engageable with the longer arm to separate the contacts upon the slide reaching its uppermost position.

6. A toaster according to claim 2 wherein said manually operable means comprises a yieldable member having a free end portion normally spaced from an inclined lip on the link, and a finger engageable plunger connected with the yieldable member.

7. A toaster according to claim 2 together with an adjustable switch operable by a cam on the slide for controlling the heating action of the heating elements.

8. A toaster comprising a slide supported for up and down movement in a vertical plane, a substantially upright link having its upper end pivotally connected to the slide and its lower end pivotally connected with a pin, the pin being supported for rotation about an axis and through an angle of 360° for each toasting cycle, and being at its uppermost position with the slide at a corresponding position at the beginning of each toasting cycle, a normally closed switch, means on said slide holding the switch open in said uppermost position thereof, an operating motor in circuit with said switch, the pivotal connections of said link and the axis of said pin being vertically alined in said uppermost position of the slide for retaining the slide in such position, manually operable means for dis-aligning said pivotal connections and axis for downward movement of the slide under gravity and with a rotation of the pin through an angle of 180° to its lowermost position, and an arm driven by the motor and rotatable through an angle of 360° in each toasting cycle, the arm engaging said pin when the slide is in its quiescent uppermost position and re-engageable with the pin at its lowermost position for raising the slide to its uppermost position.

9. The structure according to claim 8, wherein the axes of said rotatable pin and arm are aligned.

10. The structure according to claim 8, wherein said pin is supported adjacent the perimeter of a rotatable disk and said arm is supported by a motor driven shaft coaxial with said disk.

11. The structure according to claim 8, wherein said switch comprises a rigid contact member and a yieldable contact member, and said switch opening means comprising an insulated finger supported by said slide.

12. The structure according to claim 8, wherein said toaster comprises spaced heating elements between which bread supports carried by said slide are movable, a shunt circuit to said heating elements, an adjustable switch in said circuit, and a cam supported by said slide and operative to open and close said switch upon upward and downward movement of the slide.

13. A toaster comprising a frame, laterally spaced and vertically disposed heating elements carried by the frame, a slide supported by the frame and having bread slice supporting means projecting therefrom and extending between the heating elements, a circuit for the heating elements, an adjustable switch in said circuit, cam means carried by the slide and cooperating with said switch for opening the circuit during upward movement of the slide at a point in its range of movement predetermined by the adjustment of the switch, and a thermostatic strip supported by said frame and engageable with one of said contact members to hold same out of range of said cam means during the first toasting cycle wherein said strip is substantially cold.

EDWARD J. FITZGERALD.

REFERENCES CITED

The following references are of record in the file of this patent:

UNITED STATES PATENTS

| Number | Name | Date |
|---|---|---|
| 2,114,000 | Vidaver | Apr. 12, 1938 |
| 2,215,929 | Husk | Sept. 24, 1940 |
| 2,237,146 | Ireland | Apr. 1, 1941 |
| 2,260,043 | Middleton | Oct. 21, 1941 |
| 2,347,611 | Purpura | Apr. 25, 1944 |
| 2,370,404 | Huck | Feb. 27, 1945 |
| 2,402,576 | Purpura | June 25, 1946 |